US012662982B2

(12) United States Patent
Pedley et al.

(10) Patent No.: US 12,662,982 B2
(45) Date of Patent: Jun. 23, 2026

(54) FUEL PUMP

(71) Applicant: PHINIA DELPHI LUXEMBOURG SARL, Belvaux (LU)

(72) Inventors: Toby Pedley, London (GB); Adam Mercer, Dursley (GB); Erol Kahraman, Maidstone (GB)

(73) Assignee: PHINIA DELPHI LUXEMBOURG SARL, Belvaux (LU)

(*) Notice: Subject to any disclaimer, the term of this patent is extended or adjusted under 35 U.S.C. 154(b) by 237 days.

(21) Appl. No.: 18/715,713

(22) PCT Filed: Dec. 2, 2022

(86) PCT No.: PCT/EP2022/084288
§ 371 (c)(1),
(2) Date: Jun. 2, 2024

(87) PCT Pub. No.: WO2023/099766
PCT Pub. Date: Jun. 8, 2023

(65) Prior Publication Data

US 2025/0027470 A1 Jan. 23, 2025

(30) Foreign Application Priority Data

Dec. 2, 2021 (GB) ...................................... 2117440

(51) Int. Cl.
*F02M 59/36* (2006.01)
*F02M 63/00* (2006.01)

(52) U.S. Cl.
CPC ...... *F02M 59/368* (2013.01); *F02M 63/0021* (2013.01); *F02M 63/0075* (2013.01); *F02M 2200/02* (2013.01)

(58) Field of Classification Search
CPC ............. F02M 59/368; F02M 63/0021; F02M 63/0075; F02M 2200/02; F02M 59/466; F02M 59/46; F02M 63/0014
See application file for complete search history.

(56) References Cited

U.S. PATENT DOCUMENTS

| | | | |
|---|---|---|---|
| 6,056,264 | A | 5/2000 | Benson et al. |
| 2004/0026541 | A1 | 2/2004 | Sebastian et al. |

FOREIGN PATENT DOCUMENTS

| | | | |
|---|---|---|---|
| DE | 102013211173 | A1 | 12/2014 |
| EP | 2218904 | A1 | 8/2010 |

(Continued)

OTHER PUBLICATIONS

International Search Report for PCT/EP2022/084288 dated Mar. 24, 2023, 4 pages.

(Continued)

*Primary Examiner* — Xiao En Mo
(74) *Attorney, Agent, or Firm* — WARNER NORCROSS + JUDD LLP

(57) ABSTRACT

A fuel pump comprising a valve assembly. The valve assembly comprises a valve member defining a valve axis, and an electromagnetically controlled armature assembly configured to reciprocate linearly along the valve axis within an armature chamber of the fuel pump. The fuel pump further comprises a spring configured to engage a first side of the armature assembly to provide a spring force acting in a first direction along the valve axis. The fuel pump further comprises a lift stop provided on a floor surface of the armature chamber and configured to engage a second side of the armature assembly to limit movement of the armature assembly in the first direction. The armature assembly comprises an armature body fixed to an armature carrier. The armature carrier is fixed to the valve member.

20 Claims, 5 Drawing Sheets

(56) References Cited

FOREIGN PATENT DOCUMENTS

| | | | | | |
|---|---|---|---|---|---|
| EP | 3315760 | A1 | | 5/2018 | |
| WO | 2010023009 | A1 | | 3/2010 | |
| WO | 2016188651 | A1 | | 12/2016 | |
| WO | 2017148599 | A1 | | 9/2017 | |
| WO | WO-2021054006 | A1 | * | 3/2021 | .......... F04B 53/1082 |

OTHER PUBLICATIONS

Machine assisted English translation of DE102013211173A1 obtained from https://worldwide.espacenet.com/patent on May 31, 2024, 10 pages.
Machine assisted English translation of WO2010023009A1 obtained from https://worldwide.espacenet.com/patent on May 31, 2024, 7 pages.
Machine assisted English translation of WO2016188651A1 obtained from https://worldwide.espacenet.com/patent on May 31, 2024, 10 pages.
Machine assisted English translation of WO2017148599A1 obtained from https://worldwide.espacenet.com/patent on May 31, 2024, 10 pages.
Machine assisted English translation of WO2021054006A1 obtained from https://worldwide.espacenet.com/patent on May 31, 2024, 19 pages.

* cited by examiner

FUEL PUMP

CROSS-REFERENCE TO RELATED APPLICATIONS

This application is the U.S. National Stage of International Application No. PCT/EP2022/084288 filed on 2 Dec. 2022, which claims priority to and all advantages of United Kingdom Application No. 2117440.4 filed on 2 Dec. 2021, the contents of which are incorporated herein by reference.

FIELD OF THE INVENTION

This invention relates to a fuel pump, and in particular, but not exclusively, a fuel pump of a compression ignition internal combustion engine.

BACKGROUND

In an internal combustion engine, fuel is typically supplied to fuel injectors via a common rail. The fuel is typically stored at a high pressure in the common rail prior to delivery to the fuel injectors. In order to achieve the pressure in the common rail, an engine typically comprises a fuel pump. The fuel pump includes at least one pumping plunger which, through a pumping cycle, pressurizes the fuel within a pump chamber ready for delivery to the common rail. The pumping cycle may be effected by a cam arrangement configured to drive the pumping plunger, and various plunger layouts are known, including in-line arrangements and radial arrangements, for example.

A fuel pump may include a plurality of plungers to provide the pump capacity required for achieving high fuel pressure in the common rail. The fuel pump typically comprises a valve assembly associated with each plunger to control the supply of fuel into a respective pump chamber. In many examples, such a valve assembly may comprise an electromagnetically controlled/actuated valve, wherein a valve member is coupled to a magnetic armature located within a magnetic field produced by supplying an electric current to a solenoid winding. Energising the solenoid winding produces a magnetic force that motivates the armature in a given direction, thereby also moving the valve member that is coupled to the armature. The fuel pump may further include a spring configured to provide a spring force on the armature in an opposed direction to the magnetic force from the solenoid winding. The valve assembly may be an 'energise-to-close' assembly in which the spring force motivates the valve member away from a valve seat when the solenoid is not energised such that fuel is supplied into the pump chamber. In such a configuration, the valve member is motivated towards the valve seat by energising the solenoid winding to produce a magnetic force which overcomes the spring force, thereby closing the valve and blocking the supply of fuel to the pump chamber. The fuel pump may further comprise a lift stop configured to abut the armature during valve opening and thereby limit movement of the armature and the valve member in the opening direction to define the end of the valve stroke.

To enable electromagnetic control of the armature and thereby control the valve member, the armature must be influenced by the magnetic field produced by the solenoid winding. As such, the armature is formed of a material selected for its magnetic properties. However, materials with advantageous magnetic properties are typically relatively soft, typically having low wear resistance characteristics. Impacts between the armature and the lift stop during the reciprocating cycle of the valve can cause wear and damage to the magnetic armature, resulting in uneven loading of the valve member and/or potentially affecting the open and close timings of the valve.

It is against this background that the invention has been devised.

STATEMENTS OF INVENTION

In a first aspect of the invention there is provided a fuel pump comprising a valve assembly. The valve assembly comprises a valve member defining a valve axis, and an electromagnetically controlled armature assembly configured to reciprocate linearly along the valve axis within an armature chamber of the fuel pump. The fuel pump further comprises a spring configured to engage a first side of the armature assembly to provide a spring force acting in a first direction along the valve axis. The fuel pump further comprises a lift stop provided on a floor surface of the armature chamber and configured to engage a second side of the armature assembly to limit movement of the armature assembly in the first direction. The armature assembly comprises an armature body fixed to an armature carrier. The armature carrier is fixed to the valve member. In other words, the armature carrier and the valve member cannot move relative to one another.

The armature body may be fixed to the armature carrier by means of a press fit connection. Additionally or alternatively, the armature carrier may be fixed to the valve member by means of a press fit connection.

The armature carrier and armature body may each be formed of a different material. Preferably, the armature carrier may be formed of a material with a greater hardness than the material of the armature body.

The armature carrier and armature body may be arranged co-axially with the valve axis. The armature carrier may comprise a cylindrical central portion. The armature body may form an annular body around the armature carrier.

The first side of the armature assembly may comprise a spring-interfacing portion. The spring-interfacing portion may be defined by the armature carrier.

The spring may comprise a first dimension R1, and the spring-interfacing portion may extend radially from the valve axis over a second dimension R2. The second dimension R2 may be greater than or equal to the first dimension R1.

The armature body may comprise an annular recess provided on the first side of the armature assembly and co-axial with the valve axis.

The armature carrier may comprise an outwardly extending annular lip. The annular lip may be located in the annular recess provided on the first side of the armature assembly.

The spring-interfacing portion may be defined by the annular lip of the armature carrier.

The second side of the armature assembly may comprise a lift stop-interfacing portion. The lift stop-interfacing portion may be defined by the armature carrier.

The lift stop may extend radially from the valve axis over a third dimension R3, and the lift stop-interfacing portion may extend radially from the valve axis over a fourth dimension R4 The fourth dimension R4 may be greater than or equal to the third dimension R3.

The armature body may comprise a second annular recess provided on the second side of the armature assembly and co-axial with the valve axis. The armature carrier may comprise a second outwardly extending annular lip. The second annular lip may be located in the annular recess provided on the second side of the armature assembly.

The lift stop-interfacing portion may be defined by the second annular lip of the armature carrier. The armature carrier may comprise a first carrier part and a second carrier part. The first carrier part may define the spring-interfacing portion. The second carrier part may define the lift stop-interfacing portion.

In a second aspect of the invention there is provided a fuel pump comprising a valve assembly. The valve assembly comprises a valve member defining a valve axis, and an electromagnetically controlled armature assembly configured to reciprocate linearly along the valve axis within an armature chamber of the fuel pump. The fuel pump further comprises a spring configured to engage a first side of the armature assembly to provide a spring force acting in a first direction along the valve axis. The fuel pump further comprises a lift stop provided on a floor surface of the armature chamber and configured to engage a second side of the armature assembly to limit movement of the armature assembly in the first direction. The armature assembly comprises an armature body formed of a magnetic material. The armature assembly further comprises a spring-interfacing portion formed of a different material to the armature body, and a lift stop-interfacing portion formed of a different material to the armature body.

The spring-interfacing portion may be formed of a material with a greater hardness than the material of the armature body. Additionally or alternatively, the lift stop-interfacing portion may be formed of a material with a greater hardness than the material of the armature body. The spring-interfacing portion and the lift stop-interfacing portion may be formed of the same material.

The armature assembly may comprise an armature carrier. The armature carrier may define both the spring-interfacing portion and the lift stop-interfacing portion. The armature body may be fixed to the armature carrier. The armature carrier may be fixed to the valve member.

The armature body may be fixed to the armature carrier by means of a press fit connection. Additionally or alternatively, the armature carrier may be fixed to the valve member by means of a press fit connection.

The armature carrier and armature body may be arranged co-axially with the valve axis. The armature carrier may comprise a cylindrical central portion. The armature body may form an annular body around the armature carrier.

The armature body may comprise an annular recess provided on the first side of the armature assembly and co-axial with the valve axis. The armature carrier may comprise an outwardly extending annular lip. The annular lip may be located in the annular recess in the armature body. The spring-interfacing portion may be defined by the annular lip of the armature carrier.

The armature body may comprise a second annular recess provided on the second side of the armature assembly and co-axial with the valve axis. The armature carrier may comprise a second outwardly extending annular lip. The second annular lip may be located in the annular recess in the armature body on the second side of the armature assembly.

The lift stop-interfacing portion may be defined by the second annular lip of the armature carrier.

The armature carrier may comprise a first carrier part and a second carrier part. The first carrier part may define the spring-interfacing portion. The second carrier part may define the lift stop-interfacing portion.

The spring may comprise a first dimension R1, and the spring-interfacing portion may extend radially from the valve axis over a second dimension R2. The second dimension R2 may be greater than or equal to the first dimension R1.

The lift stop may extend radially from the valve axis over a third dimension R3, and the lift stop-interfacing portion may extend radially from the valve axis over a fourth dimension R4. The fourth dimension R4 may be greater than or equal to the third dimension R3.

It will be appreciated that the various features of each aspect of the invention are equally applicable to, alone or in appropriate combination, with other aspects of the invention, even if the combination is not explicitly mentioned in the aforementioned statements.

BRIEF DESCRIPTION OF THE DRAWINGS

The above and other aspects of the invention will now be described, by way of example only, with reference to the accompanying figures in which.

SPECIFIC DESCRIPTION

Figure 1:
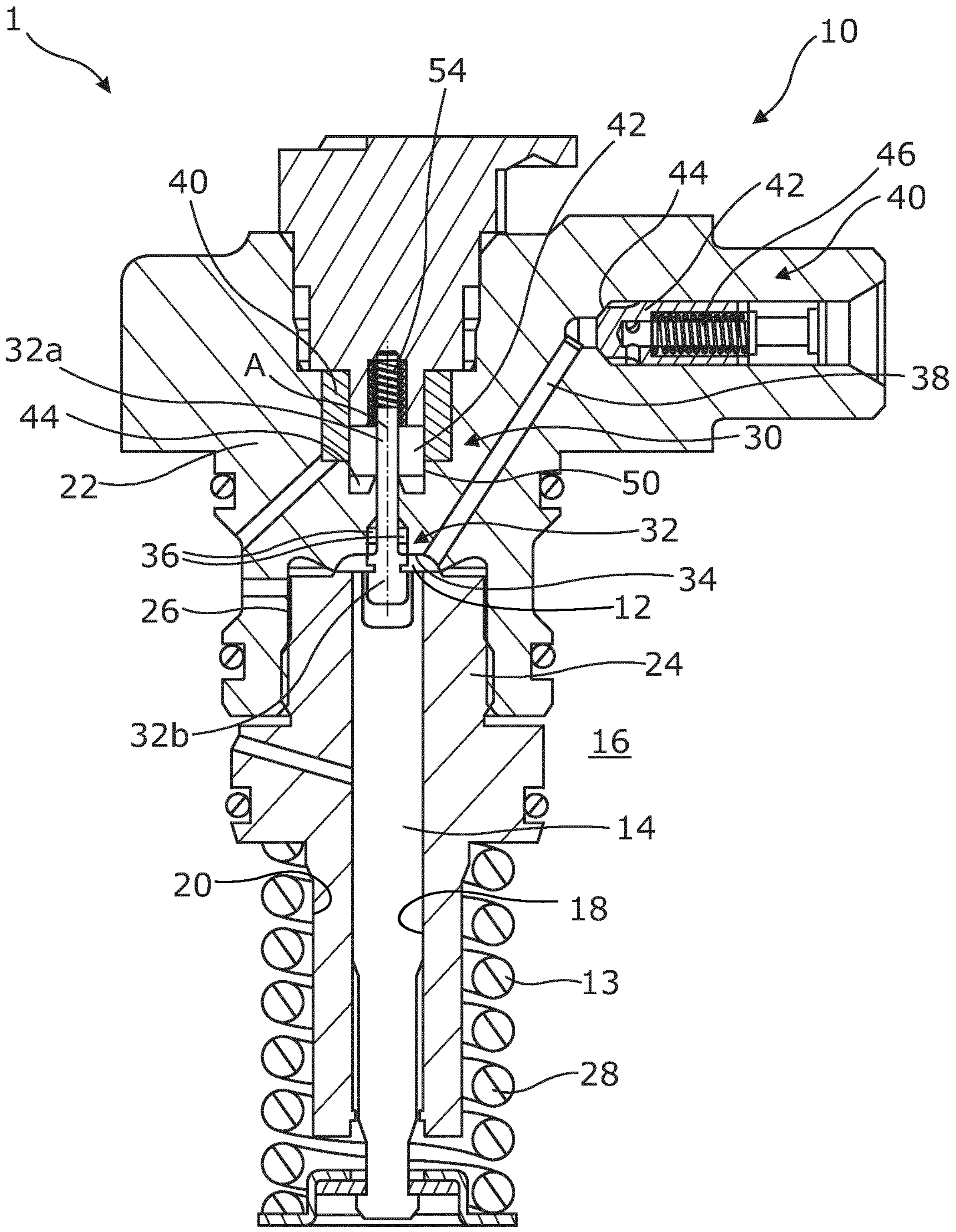
FIG. 1 is a schematic cross-sectional view of a fuel pump.

The invention relates to a fuel pump 1 for use in an internal combustion engine, such as a compression ignition engine for example. With reference to FIG. 1, the fuel pump 1 includes a plurality of pump units 10 (only one of which is shown). Each pump unit 10 is configured to pressurise fuel within a pump chamber 12. As such, each pump unit 10 comprises a pumping plunger 14, which may be driven by a cam arrangement (not shown). Whilst not shown in the accompanying figures, the fuel pump 1 may include a drive shaft extending through a main pump housing 16 and carrying a plurality of cams which are each arranged to drive an associated plunger 14 through a pumping cycle.

For the purpose of explaining the present invention, only one of the pump units 10 will be described in detail with reference to FIG. 1. However, it will be appreciated that the description applies equally to each of the respective pump units 10 in a fuel pump 1.

The pump unit 10 includes a barrel 18 which is received within the main pump housing 16 and which is provided with a plunger bore 20 for receiving the pumping plunger 14. The pump unit 10 further includes a pump head housing 22 (referred to hereinafter as the pump head) which is mounted on the barrel 18. A turret portion 24 of the barrel 18 is received in a recess 26 in the pump head 22. As shown in FIG. 1, the pump chamber 12 may be defined in part by the pump head housing 22 and the turret portion 24. The plunger 14 is driven within the plunger bore 20, under the action of the driven cam (not shown), to perform a pump cycle in which fuel is drawn into the pump chamber 12 and pressurised before being delivered from the fuel pump 1 to the downstream parts of the system. A return spring 28 acts on the plunger 14 to effect a plunger return stroke, which forms part of the pump cycle.

A valve assembly 30 controls the supply of fuel to the pump chamber 12 when the fuel pump 1 is in use. The valve assembly 30 includes a valve member 32 defining a longitudinal valve axis A. In preferred examples, the valve member 32 may be aligned with the axis of the plunger 14. The inlet valve member 32 includes an upper stem region 32*a* and a lower head region 32*b*. The head region 32*b* defines a seating surface which is engageable with a valve seat 34 defined within the recess 26 in the pump head 22. Fuel is supplied to the pump chamber 12 at a relatively low pressure through a plurality of inlet channels 36. The cross-sectional view in FIG. 1 shows two inlet channels 36, though it will be appreciated that there may be more or less than two inlet channels 36 in some examples.

The head region 32*b* of the valve member 32 is moveable towards and away from the valve seat 34. When the head region 32*b* of the valve member 32 is seated against the valve seat 34, the flow route into the pump chamber 12 is blocked, and fuel is unable to enter the pump chamber 12 through the inlet channels 36. Conversely, when the head region 32*b* of the valve member 32 is moved away from the valve seat 34 (in a downwards direction in FIG. 1), fuel is drawn into the pump chamber 12 through the inlet channels 36 and between the spaced-apart head region 32*b* and valve seat 34. Fuel may be motivated into the pump chamber 12 by vacuum pressure in the pump chamber 12 as a result of the pump chamber volume expanding due to the plunger 14 being withdrawn from the pump chamber 12 under the force of the return spring 28.

The fuel in the pump chamber 12 is pressurized by closing the valve head region 32*b* against the valve seat 34 and driving the plunger 14 to reduce the volume in the pump chamber 12. The pressurized fuel is supplied to downstream parts of the system via a conduit 38 in the pump head 22 and an outlet valve arrangement 40. The outlet valve arrangement 40 is therefore in fluid communication with the pump chamber 12 via the conduit 38. The outlet valve arrangement 40 includes an outlet valve 42 which is urged against an outlet valve seat 44 by a valve spring 46. When the fuel pressure in the pump chamber 12, and conduit 38, exceeds a threshold sufficient to overcome the resistive force of the valve spring 46 (and other pressure in the downstream parts of the fuel system), the outlet valve 42 is lifted away from the outlet valve seat 44 and pressurized fuel flows from the pump chamber 12 to the downstream parts of the fuel system.

Figure 2:
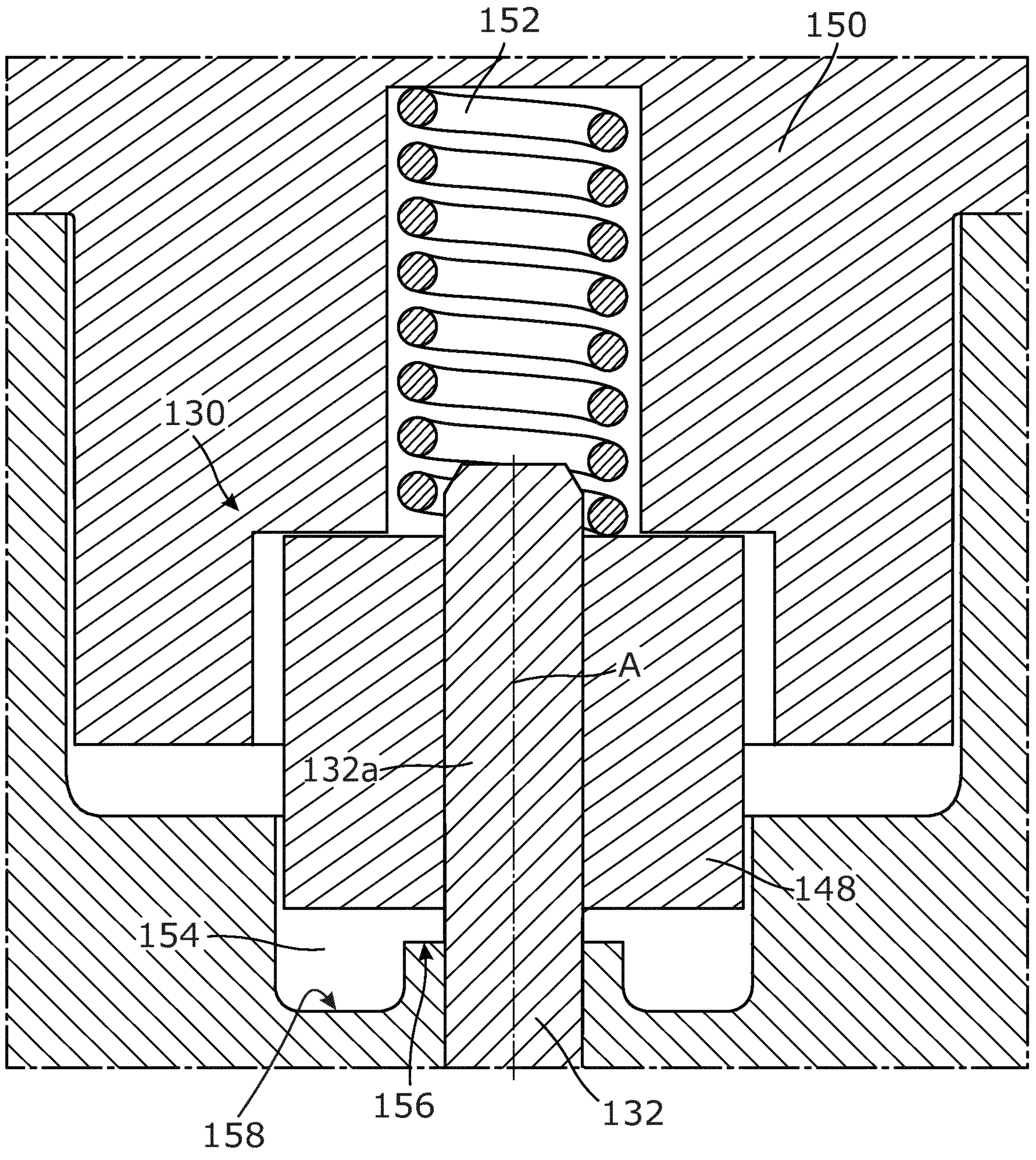
FIG. 2 (Prior art)
FIG. 2 is a schematic cross-sectional view of a prior art armature coupled to a valve member, in a fuel pump such as that shown in FIG. 1.

Referring now to FIG. 2, a valve assembly 130 in accordance with an example of the prior art is shown in a schematic cross-sectional view. It will be appreciated that the prior art valve assembly 130 may be used in a fuel pump 1 such as that shown in FIG. 1, and description of equal features will not be repeated here for conciseness. The valve assembly 130 includes a valve member 132 and an electromagnetically controlled armature 148 coupled to the valve member 132. As explained by way of background above, the armature 148 is located within a magnetic field produced by supplying an electric current to a solenoid winding 150. The prior art armature 148 is formed of a magnetic material so that when a magnetic field is created by providing an electric current through the solenoid winding 150, the armature 148, and therefore also the valve member 132, are motivated in a specific direction.

In accordance with this example of the prior art, a spring 152 is also included to engage the armature 148 and provide a spring force in an opposing direction to the direction in which the magnetic field motivates the armature 148. In the same way as described by way of background, the valve assembly 130 in this prior art example is a normally open, or 'energise-to-close', valve assembly. As such, the spring force acting on the armature 148 motivates the valve member 132 into an open position, and energising the solenoid winding 150 to produce a magnetic field attracts the armature 148 in an opposite sense to the spring force, thereby motivating the valve member 132 into a closed portion.

Under influence of the opposing spring force and magnetic force, the armature 148 of the prior art valve assembly 130 reciprocates linearly along the valve axis A within an armature chamber 154. A lift stop 156 is provided on a floor surface 158 of the armature chamber 154. The lift stop 156 is configured to limit the extent of movement of the armature 148 in a given direction, for example to limit the extent of movement under influence of the spring 152. The lift stop 156 engages the armature 148 to define a maximum stroke length of the valve member 132, i.e. to define a maximum open position.

In order to accurately control the flow of fuel into the pump chamber 12, the valve 132 must be opened and closed with considerable speed. As previously described, the valve 132 is moved by moving the armature 148 to which it is coupled. It follows that the armature 148 is similarly required to move at a considerable speed, and the spring force and magnetic forces acting on the armature 148 are therefore relatively high. As such, engagement between the armature 148 and lift stop 156 results in relatively high impact forces which can, over time, cause significant wear on the armature 148, which is typically made from a relatively soft material selected for its advantageous magnetic properties. Wear on the armature 148 can affect the accuracy of open and close valve timings, can cause variations in the valve stroke length, and can cause uneven loading on, and subsequent fracture of, the valve stem 132*a*.

As will now be described with reference to the examples in the remaining figures, the present invention overcomes at least some of the above-described challenges of valve assemblies 130 of the prior art.

Figure 3:
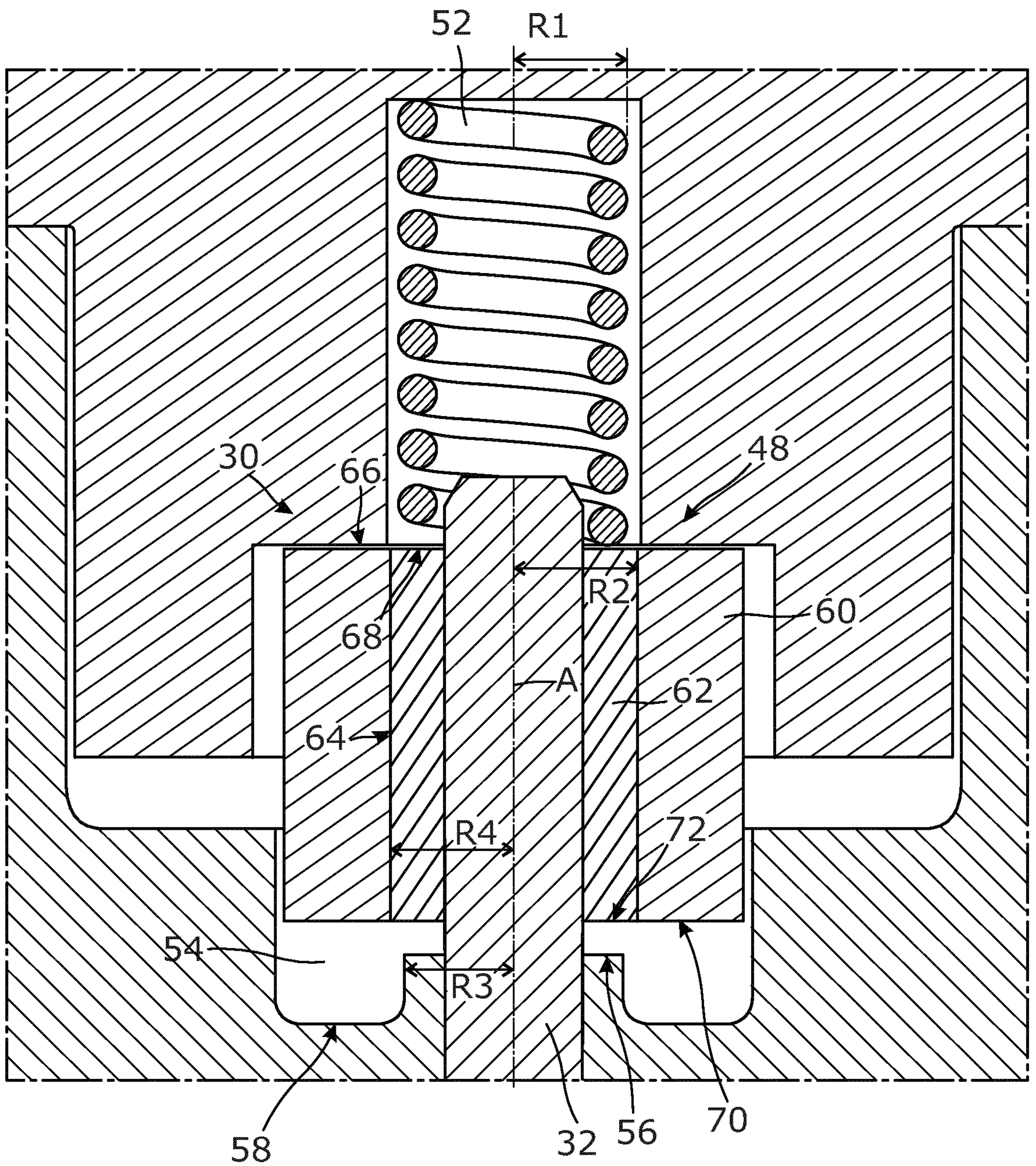
FIG. 3 is a schematic cross-sectional view of an example of an armature assembly coupled to a valve member in the fuel pump shown in FIG. 1, wherein the armature assembly comprises an armature body and an armature carrier.

FIG. 3 shows a schematic cross-sectional view of a valve assembly 30 in a fuel pump 1 such as that described previously with reference to FIG. 1. Similar to aspects of the fuel pump 1 described in relation to the valve assembly 130 of the prior art, the fuel pump 1 in this example also comprises an armature chamber 54 and a lift stop 56 provided on a floor surface 58 of the armature chamber 54. The fuel pump 1 further comprises a valve assembly 30 having a valve member 32 that defines the valve axis A.

In accordance with examples of the present invention, the valve assembly 30 further comprises an electromagnetically controlled armature assembly 48 configured to reciprocate linearly along the valve axis A within the armature chamber 54. The armature assembly 48 comprises a magnetic armature body 60 coupled to an armature carrier 62 (i.e. a component 62 which carries the armature body 60 so that the body cannot move relative to it). Coupling the armature body 60 to the armature carrier 62 may comprise a threaded connection in some examples, or in other examples may comprise a press-fit connection, or even a crimped connection. As such, the invention is not limited to a specific method of coupling the armature body 60 to the armature carrier 62. The armature carrier 62 is coupled to the valve member 32. Coupling the armature carrier 62 to the valve member 32 may comprise a threaded connection in some examples, or in other examples may comprise a press-fit connection, or even a crimped connection. It follows that the invention is also not limited to a specific method of coupling the armature carrier 62 to the valve member 32.

Providing the armature assembly 48 as a plurality of different components advantageously facilitates an optimized material selection for each component. As such, the armature carrier 62 and armature body 60 may be formed of different materials. For example, the armature body 60 is made of a material selected for its advantageous magnetic properties. A material with a greater hardness than the armature body 60 may be selected for the armature carrier 62 to increase the longevity of the armature assembly 48 and reduce wear.

The armature body 60 and armature carrier 62 are preferably arranged co-axially with the valve axis A. Such a configuration helps to ensure even loading of the valve member 32 in use, and thereby decreases wear on the valve member 32 during reciprocating valve strokes. For example, the armature carrier 62 may comprise a substantially cylindrical central portion 64 and the armature body 60 may form an annular body around the armature carrier 62. Such a configuration facilitates both simplified manufacture of the armature body 60 and carrier 62, and simple assembly of the armature assembly 48.

In the same way as described previously with reference to the prior art valve assembly 130, the fuel pump 1 in this example further comprises a spring 52 configured to engage a first side 66, or first end, of the armature assembly 48 to provide a spring force acting in a first direction substantially along the valve axis A. The first side 66 of the armature assembly 48 therefore comprises a spring-interfacing portion 68. As previously described, the lift stop 56 is configured to engage an opposing second side 70, or second end, of the armature assembly 48 to limit movement of the armature assembly 48 in the first direction. It follows that the second side 70 of the armature assembly 48 comprises a lift stop-interfacing portion 72. The spring-interfacing portion 68 is a separate part from the armature body 60, which does not interface directly with the spring 52.

To increase the longevity and wear resistance of the armature assembly 48, the spring-interfacing portion 68 and the lift stop-interfacing portion 72 are each formed of a different material to the material selected for the armature body 60. As such, the material of the spring-interfacing portion 68, and the material of the lift stop-interfacing portion 72, can be selected for hardness and wear resistance properties, whilst the armature body 60 may be formed of a material selected for its magnetic properties. The spring-interfacing portion 68 and the lift stop-interfacing portion 72 may be formed of the same material. For example, the spring-interfacing portion 68 and the lift stop-interfacing portion 72 may both be defined by the armature carrier 62, as shown in FIG. 3.

The spring 52 comprises a first dimension R1, which may be a radius of the spring 52 for example. The spring-interfacing portion 68 extends radially from the valve axis A over a second dimension R2 as shown in FIG. 3. The second dimension R2 is greater than or equal to the first dimension R1, thereby ensuring that the spring 52 only engages the spring-interfacing portion 68 of the armature assembly 48, and not the armature body 60.

With the valve member 32 assembled in the fuel pump 1, the lift stop 56 on the floor surface 58 of the armature chamber 54 extends radially from the valve axis A over a third dimension R3. The lift stop-interfacing portion 72 of the armature assembly 48 extends radially from the valve axis A over a fourth dimension R4 as shown in FIG. 3. The fourth dimension R4 is greater than or equal to the third dimension R3. This helps to ensure that the lift stop 56 only engages the lift stop-interfacing portion 72 of the armature assembly 48, and not the armature body 60.

Figure 4:
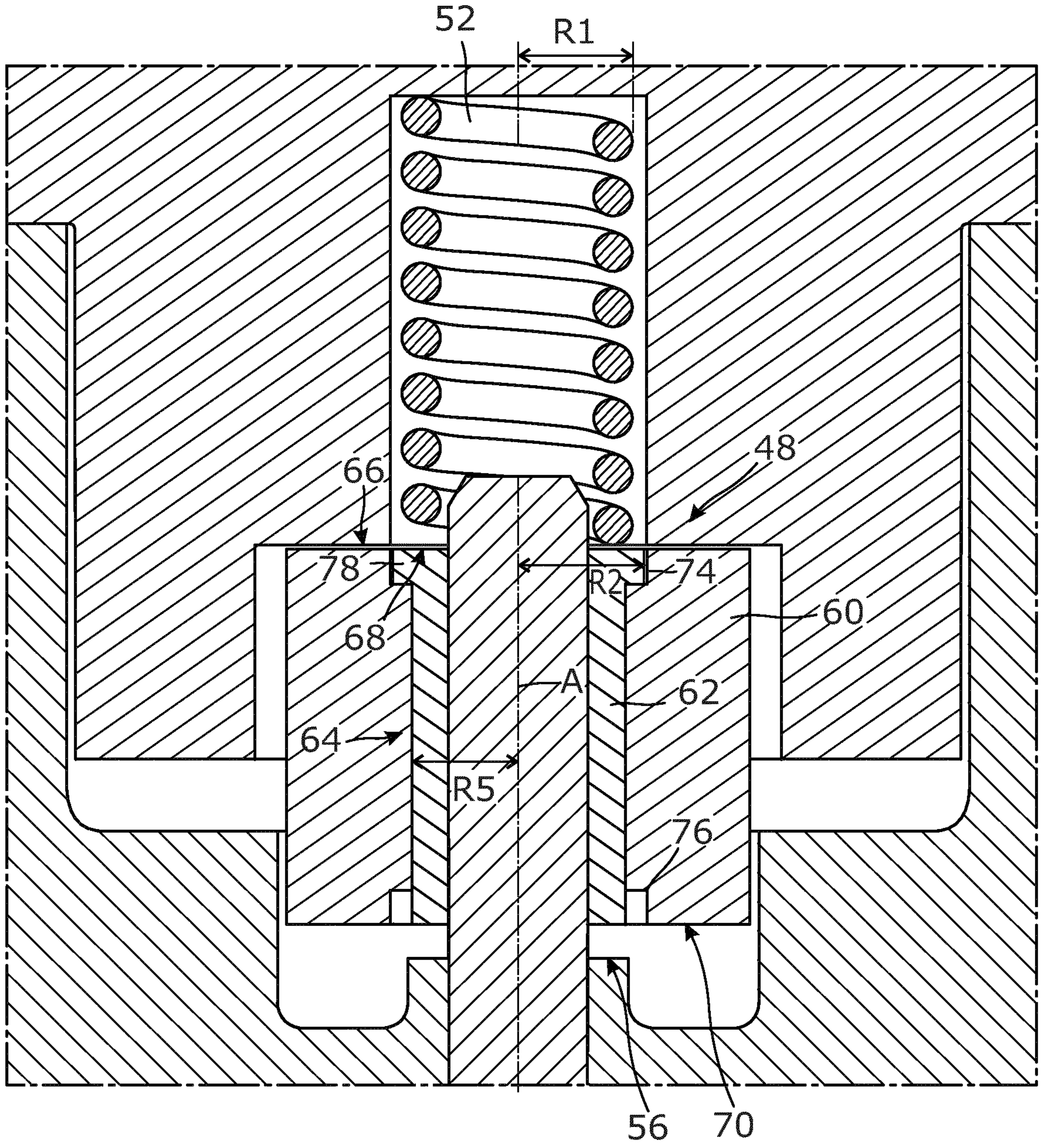
FIG. 4 is a schematic cross-sectional view of another example of an armature assembly coupled to a valve member.

Referring now to FIG. 4, a further example of an armature assembly 48 in accordance with aspects of the invention is shown in a schematic cross section. In this example, the armature body 60 comprises an annular recess 74 provided on the first side 66 of the armature assembly 48 and co-axial with the valve axis A. The annular recess 74 further separates the armature body 60 from the spring 52 to ensure that the armature body 60 is not worn by contact with the spring 52. The second side 70 of the armature assembly 48 may be configured in a similar manner, as shown in FIG. 4, where an annular recess 76 is provided co-axially with the valve axis A. Similarly, the annular recess 76 on the second side 70 of the armature assembly 48 separates the armature body 60 from the lift stop 56 to further ensure the armature body 60 is not impacted by the lift stop 56.

In preferred examples, such as that shown in FIG. 4, the armature carrier 62 comprises an outwardly extending annular lip 78. The spring-interfacing portion 68 is preferably defined by the annular lip 78. The inclusion of a lip 78 facilitates an increased second dimension R2, i.e. increased radial dimension of the spring-interfacing portion 68, without unduly increasing the radial dimension R5 of the cylindrical central portion 64. Accordingly, the volume of the armature body 60 and therefore the volume of magnetic material in the armature assembly 48, can be increased without increasing the external dimensions of the armature body 60.

The annular lip 78 is preferably located in the annular recess 74 provided on the first side 66 of the armature assembly 48. The lip 78 abuts the recess 74 and the mechanical engagement of the lip 78 with the recess 74 helps to ensure that the inertial forces experienced by the carrier 62 do not result in any relative movement between the carrier 62 and the armature body 60 during armature energisation.

Figure 5:
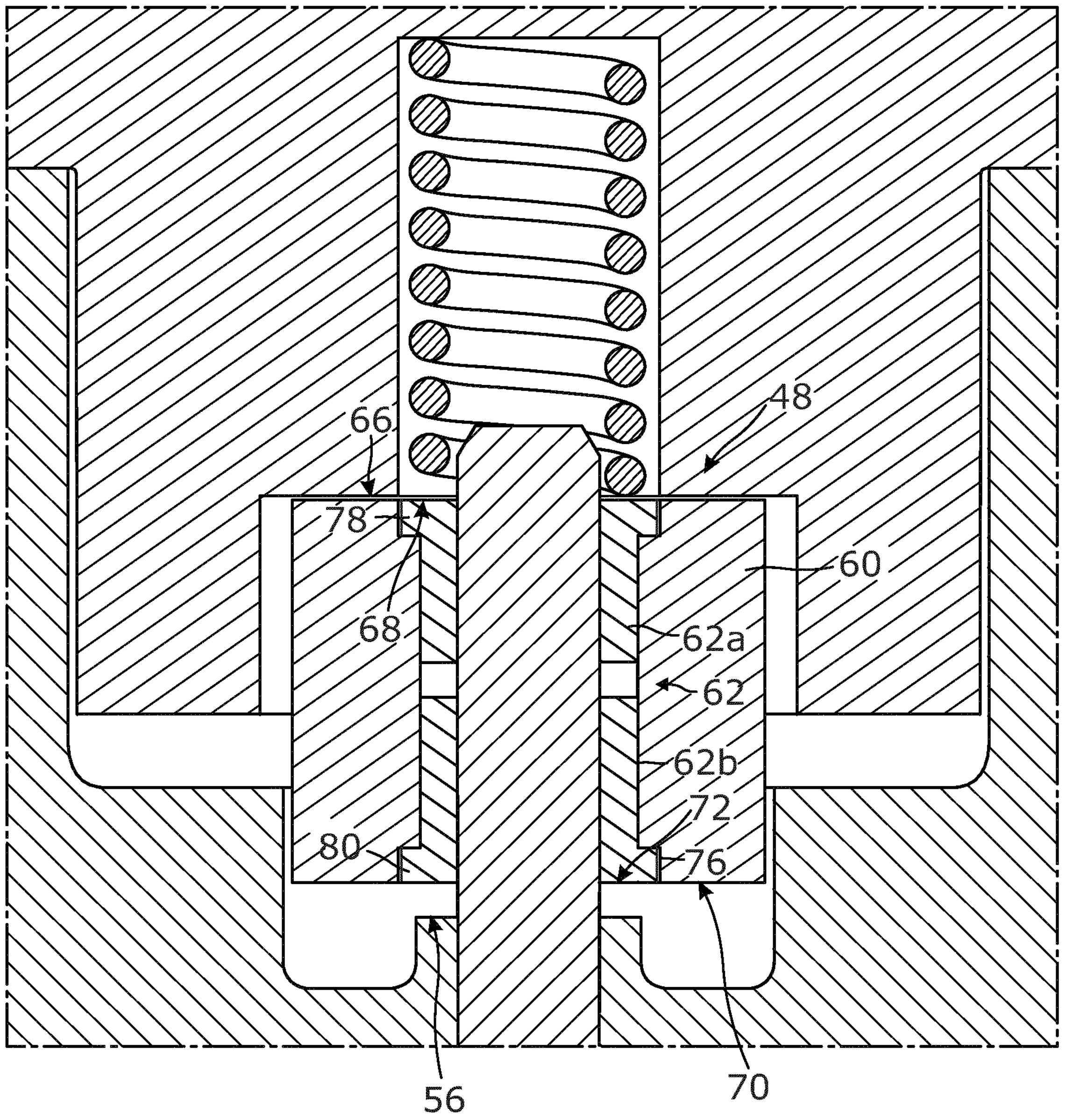
FIG. 5 is a schematic cross-sectional view of another example of an armature assembly coupled to a valve member, wherein the armature carrier is formed of a first carrier part and a second carrier part.

With reference to FIG. 5, in a further example of an armature assembly 48 in accordance with aspects of the invention, the armature carrier 62 may comprise a second outwardly extending annular lip 80 on the second side 70 of the armature assembly 48. The second outwardly extending annular lip 80 may be located in the annular recess 76 provided on the second side 70 of the armature assembly 48 and may define the lift stop-interfacing portion 72 of the armature assembly 48. Such a configuration ensures that the inertial forces experienced by the carrier 62 during impacts with the lift stop 56 do not cause relative movement between the carrier 62 and the armature body 60.

The second annular lip 80 may be included in addition to the previously described annular lip 78 on the first side 66 of the armature assembly 48. As such, relative movement between the carrier 62 and armature body 60 is prevented in both directions throughout the reciprocating valve cycle.

For ease of manufacture, the armature carrier 62 in such an example may be formed of a first carrier part **62*a* and a second carrier part 62*b*. For example, the first carrier part 62*a* may define the spring-interfacing portion 68 of the armature assembly 48, and the second carrier part 62*b* may define the lift stop-interfacing portion 72 of the armature assembly 48**.

In some examples both the first and second carrier parts **62*a*, 62*b* may be formed of the same material. However, it will be appreciated that in other examples it may be advantageous to form each of the carrier parts 62***a*, 62*b* of different materials. As such, this configuration further facilitates tailoring the material selection to the specific function of each component of the armature assembly 48.

The annular lips 78, 80 of the first and second carrier parts 62*a*, 62*b* may be used to effectively clamp the armature body 60 relative to the valve member 32. In such an example, the armature body 60 is again preferably fixed to the first and second parts 62*a*, 62*b* of the carrier 62, with the first and second carrier parts 62*a*, 62*b* being fixed to the valve member 32.

Whilst not shown in the accompanying figures, it will be appreciated than in some examples the armature carrier 62 may comprise an annular lip 78 as previously described, without requiring an annular recess 74. In such an example it will be appreciated that the annular lip abuts a surface of the armature body 60 on the first side 66 of the armature assembly 48. Further, the armature carrier 62 may comprise a second annular lip 80 as previously described, without requiring a second annular recess 76. In such examples it will be appreciated that the second annular lip abuts a surface of the armature body 60 on the second side 70 of the armature assembly 48. The provision of a carrier 62 comprising one or more annular lips 78, 80 without requiring one or more annular recesses 74, 76 is equally applicable in examples where the carrier 62 is formed of a first and second carrier part 62*a*, 62*b*.

It will be appreciated that various other examples of the invention are also envisaged without departing from the scope of the appended claims. Further, it will be appreciated that the above described examples are provided by way of example only, and that other examples of the invention may include any combination of the features described with reference to each of the examples above.

The invention claimed is:

1. A fuel pump comprising:

a valve assembly comprising a valve member defining a valve axis, and an electromagnetically controlled armature assembly configured to reciprocate linearly along the valve axis within an armature chamber of the fuel pump;

a spring configured to engage a first side of the armature assembly to provide a spring force acting in a first direction along the valve axis; and a lift stop provided on a floor surface of the armature chamber and configured to engage a second side of the armature assembly to limit movement of the armature assembly in the first direction;

wherein the armature assembly comprises an armature body fixed to an armature carrier, and wherein the armature carrier is fixed to the valve member.

2. The fuel pump of claim 1, wherein the armature body is fixed to the armature carrier via a press fit connection, and/or wherein the armature carrier is fixed to the valve member via a press fit connection.

3. The fuel pump of claim 1, wherein the armature carrier and the armature body are each formed of a different material and, optionally, wherein the armature carrier is formed of a material with a greater hardness than the material of the armature body.

4. The fuel pump of claim 1, wherein the armature carrier and the armature body are arranged co-axially with the valve axis.

5. The fuel pump of claim 1, wherein the first side of the armature assembly comprises a spring-interfacing portion, and wherein the spring-interfacing portion is defined by the armature carrier.

6. The fuel pump of claim 5, wherein the spring comprises a first dimension R1, and wherein the spring-interfacing portion extends radially from the valve axis over a second dimension R2, wherein the second dimension R2 is greater than or equal to the first dimension R1.

7. The fuel pump of claim 5, wherein the armature body comprises an annular recess provided on the first side of the armature assembly and co-axial with the valve axis.

8. The fuel pump of claim 7, wherein the armature carrier comprises an outwardly extending annular lip, and the annular lip is located in the annular recess provided on the first side of the armature assembly.

9. The fuel pump of claim 5, wherein the second side of the armature assembly comprises a lift stop-interfacing portion, and wherein the lift stop-interfacing portion is defined by the armature carrier.

10. The fuel pump of claim 9, wherein the lift stop extends radially from the valve axis over a third dimension R3, and wherein the lift stop-interfacing portion extends radially from the valve axis over a fourth dimension R4, wherein the fourth dimension R4 is greater than or equal to the third dimension R3.

11. The fuel pump of claim 9, wherein the armature body comprises a second annular recess provided on the second side of the armature assembly and co-axial with the valve axis.

12. The fuel pump of claim 11, wherein the armature carrier comprises a second outwardly extending annular lip, and the second annular lip is located in the second annular recess provided on the second side of the armature assembly.

13. The fuel pump of claim 12, wherein the armature carrier comprises a first carrier part and a second carrier part, the first carrier part defining the spring-interfacing portion, and the second carrier part defining the lift stop-interfacing portion.

14. A fuel pump-comprising:

a valve assembly comprising a valve member defining a valve axis, and an electromagnetically controlled armature assembly configured to reciprocate linearly along the valve axis within an armature chamber of the fuel pump;

a spring configured to engage a first side of the armature assembly to provide a spring force acting in a first direction along the valve axis; and a lift stop provided on a floor surface of the armature chamber and configured to engage a second side of the armature assembly to limit movement of the armature assembly in the first direction;

wherein the armature assembly comprises an armature body formed of a magnetic material, a spring-interfacing portion formed of a different material to the armature body, and a lift stop-interfacing portion formed of a different material to the armature body.

15. The fuel pump of claim 14, wherein the spring-interfacing portion and/or the lift stop-interfacing portion are formed of a material with a greater hardness than the material of the armature body.

16. The fuel pump of claim 14, wherein the armature assembly comprises an armature carrier defining both the spring-interfacing portion and the lift stop-interfacing portion.

17. The fuel pump of claim 16, wherein the armature body is fixed to the armature carrier, and wherein the armature carrier is fixed to the valve member.

18. The fuel pump of claim 16, wherein the armature carrier and armature body are arranged co-axially with the valve axis.

19. The fuel pump of claim 16, wherein the armature carrier comprises a first carrier part and a second carrier part, the first carrier part defining the spring-interfacing portion, and the second carrier part defining the lift stop-interfacing portion.

20. The fuel pump of claim 14, wherein the spring comprises a first dimension R1, and wherein the spring-interfacing portion extends radially from the valve axis over a second dimension R2, wherein the second dimension R2 is greater than or equal to the first dimension R1 and, optionally wherein the lift stop extends radially from the valve axis (A) over a third dimension R3, and wherein the lift stop-interfacing portion extends radially from the valve axis over a fourth dimension R4, wherein the fourth dimension R4 is greater than or equal to the third dimension R3.

* * * * *